United States Patent
Onishi et al.

(10) Patent No.: US 11,569,489 B2
(45) Date of Patent: Jan. 31, 2023

(54) SLURRY FOR NON-AQUEOUS SECONDARY BATTERY AND METHOD OF PRODUCING SAME, BATTERY MEMBER FOR NON-AQUEOUS SECONDARY BATTERY AND METHOD OF PRODUCING SAME, AND NON-AQUEOUS SECONDARY BATTERY

(71) Applicant: ZEON CORPORATION, Tokyo (JP)

(72) Inventors: Masuhiro Onishi, Tokyo (JP); Masanobu Sato, Tokyo (JP); Hiroshi Koga, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 116 days.

(21) Appl. No.: 17/254,297

(22) PCT Filed: Jul. 23, 2019

(86) PCT No.: PCT/JP2019/028882
§ 371 (c)(1),
(2) Date: Dec. 21, 2020

(87) PCT Pub. No.: WO2020/022343
PCT Pub. Date: Jan. 30, 2020

(65) Prior Publication Data
US 2021/0218009 A1      Jul. 15, 2021

(30) Foreign Application Priority Data

Jul. 24, 2018   (JP) .............. JP2018-138480

(51) Int. Cl.
*H01M 4/04*   (2006.01)
*H01M 4/139*  (2010.01)
*H01M 4/62*   (2006.01)

(52) U.S. Cl.
CPC ........... *H01M 4/0419* (2013.01); *H01M 4/04* (2013.01); *H01M 4/139* (2013.01); *H01M 4/622* (2013.01)

(58) Field of Classification Search
None
See application file for complete search history.

(56) References Cited

U.S. PATENT DOCUMENTS

| | | |
|---|---|---|
| 2011/0187788 A1 | 8/2011 | Fujioka et al. |
| 2013/0330622 A1 | 12/2013 | Sasaki |
| 2015/0188108 A1 | 7/2015 | Miyazawa et al. |
| 2017/0117521 A1 | 4/2017 | Sasaki |
| 2018/0183047 A1 | 6/2018 | Sakamoto et al. |

FOREIGN PATENT DOCUMENTS

| | | | |
|---|---|---|---|
| EP | 3361533 A1 | 8/2018 | |
| EP | 3657578 A1 | 5/2020 | |
| JP | 2011156740 A | 8/2011 | |
| JP | 2012204303 A | 10/2012 | |
| JP | 2013145763 A | 7/2013 | |
| JP | 6864698 | * 4/2021 | |
| JP | 6951177 | * 10/2021 | |
| WO | 2012115096 A1 | 8/2012 | |
| WO | 2014017651 A1 | 1/2014 | |
| WO | 2015198530 A1 | 12/2015 | |
| WO | 2017138192 A1 | 8/2017 | |
| WO | WO2017138192 A1 * | 8/2017 | .......... H01M 4/1391 |

OTHER PUBLICATIONS

Sep. 24, 2019, International Search Report issued in the International Patent Application No. PCT/JP2019/028882.

Jan. 26, 2021, International Preliminary Report on Patentability issued in the International Patent Application No. PCT/JP2019/028882.

Mar. 22, 2022, the Extended European Search Report issued by the European Patent Office in the corresponding European Patent Application No. 19840019.4.

* cited by examiner

*Primary Examiner* — Alix E Eggerding
(74) *Attorney, Agent, or Firm* — Kenja IP Law PC

(57) ABSTRACT

Provided is a technique relating to a slurry for a non-aqueous secondary battery that can stably be applied onto a battery member surface even in a situation in which an inkjet method is adopted. A method of producing the slurry for a non-aqueous secondary battery includes a degassing step of reducing the dissolved carbon dioxide gas concentration of a mixture containing a particulate polymer (A) and water.

8 Claims, No Drawings

SLURRY FOR NON-AQUEOUS SECONDARY BATTERY AND METHOD OF PRODUCING SAME, BATTERY MEMBER FOR NON-AQUEOUS SECONDARY BATTERY AND METHOD OF PRODUCING SAME, AND NON-AQUEOUS SECONDARY BATTERY

TECHNICAL FIELD

The present disclosure relates to a slurry for a non-aqueous secondary battery and method of producing the same, a battery member for a non-aqueous secondary battery and method of producing the same, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery generally includes battery members such as a positive electrode, a negative electrode, and a separator that isolates the positive electrode and the negative electrode from each other and prevents short circuiting between the positive and negative electrodes.

In production of a secondary battery such as described above, a technique of affixing battery members of the secondary battery, such as an electrode and a separator, to obtain a laminate for a secondary battery is a conventionally used technique. Battery members are adhered by, for example, producing a battery member that includes an adhesive material at the surface thereof and then affixing this battery member to another battery member. A battery member that includes an adhesive material at the surface thereof can be produced by applying, onto a surface of the battery member, a slurry for a secondary battery containing an adhesive polymer (binder) and so forth that are dispersed and/or dissolved in a solvent, and subsequently drying the slurry for a secondary battery.

In Patent Literature (PTL) 1, for example, organic particles having a core-shell structure including a core portion and a shell portion are used as a binder. A polymer forming the core portion and a polymer forming the shell portion are polymers each having a specific degree of swelling in electrolyte solution. In PTL 1, a battery member including an adhesive layer is produced through application and drying of a slurry that contains these organic particles, and then the battery member that includes the adhesive layer is affixed to another battery member to produce a laminate for a secondary battery. The obtained laminate for a secondary battery is sealed in a battery container with an electrolyte solution to produce a secondary battery.

CITATION LIST

Patent Literature

PTL 1: WO2015/198530A1

SUMMARY

Technical Problem

The inventors focused on an inkjet method in which a slurry for a secondary battery that is for forming an adhesive material is supplied to a battery member surface by ejecting the slurry for a secondary battery from a nozzle as fine droplets with the aim of strongly adhering battery members to each other while also increasing secondary battery production efficiency. The inventors attempted to produce a battery member including an adhesive material by applying a slurry for a secondary battery containing a particulate polymer such as the organic particles described in PTL 1 onto a battery member surface by an inkjet method and then drying the slurry for a secondary battery on the battery member surface. However, studies conducted by the inventors revealed that when a slurry for a secondary battery containing a particulate polymer such as the organic particles described in PTL 1 is applied onto a battery member surface by an inkjet method, coatability may become unstable due to nozzle clogging, and production efficiency of a battery member, and thus also of a secondary battery, may decrease.

In other words, the conventional technique described above still leaves room for improvement in terms of ensuring strong adhesion of battery members while also enabling stable application of a slurry for a secondary battery onto a battery member surface even in a situation in which an inkjet method or the like is adopted.

Accordingly, one object of the present disclosure is to provide a slurry for a secondary battery that can stably be applied onto a battery member surface without nozzle clogging easily occurring even in a situation in which an inkjet method is adopted, and also to provide a method of producing this slurry for a non-aqueous secondary battery.

Another object of the present disclosure is to provide a battery member for a non-aqueous secondary battery for which a presently disclosed slurry for a non-aqueous secondary battery is used, and also to provide a method of producing this battery member for a non-aqueous secondary battery.

Yet another object of the present disclosure is to provide a non-aqueous secondary battery including a presently disclosed battery member for a non-aqueous secondary battery.

Solution to Problem

The inventors conducted diligent investigation with the aim of solving the problems described above. The inventors discovered that a slurry obtained by reducing the dissolved carbon dioxide gas concentration of a mixture containing a particulate polymer (A) and water can serve as a slurry for a non-aqueous secondary battery that can inhibit nozzle clogging and can stably be applied onto a battery member surface even in a situation in which an inkjet method such as described above is adopted. In this manner, the inventors completed the present disclosure.

Specifically, the present disclosure aims to advantageously solve the problems set forth above, and a presently disclosed method of producing a slurry for a non-aqueous secondary battery comprises a degassing step of reducing dissolved carbon dioxide gas concentration of a mixture containing a particulate polymer (A) and water. Through the presently disclosed production method, it is possible to provide a slurry for a non-aqueous secondary battery that can inhibit nozzle clogging and can stably be applied onto a battery member surface even in a situation in which an inkjet method is adopted compared to when the mixture is used in that form without performing degassing.

In the presently disclosed method of producing a slurry for a non-aqueous secondary battery, degassing is preferably performed in the degassing step until the dissolved carbon dioxide gas concentration of the mixture is not less than 0.01 mg/mL and not more than 0.08 mg/mL. By performing degassing until the dissolved carbon dioxide gas concentration of the mixture is within the range set forth above, it is possible to obtain a slurry for a non-aqueous secondary battery having further improved coatability.

Moreover, the present disclosure aims to advantageously solve the problems set forth above, and a presently disclosed slurry for a non-aqueous secondary battery comprises a particulate polymer (A) and water, and has a dissolved carbon dioxide gas concentration of not less than 0.01 mg/mL and not more than 0.08 mg/mL. According to the present disclosure, it is possible to provide a slurry for a non-aqueous secondary battery that can inhibit nozzle clogging and can stably be applied onto a battery member surface even in a situation in which an inkjet method is adopted.

Furthermore, the present disclosure aims to advantageously solve the problems set forth above, and a presently disclosed battery member for a non-aqueous secondary battery comprises: a substrate; and an adhesive material formed in plurality in a dotted form on at least one surface of the substrate, wherein the substrate is a separator substrate or an electrode substrate, and the adhesive material is a dried product of the slurry for a non-aqueous secondary battery set forth above. A substrate that includes, at a surface thereof, an adhesive material that is disposed in plurality in a dotted form and that is obtained by drying the slurry for a non-aqueous secondary battery set forth above can strongly adhere to another adjacent battery member (for example, an electrode) via the adhesive material.

Also, the present disclosure aims to advantageously solve the problems set forth above, and a presently disclosed method of producing a battery member for a non-aqueous secondary battery comprises an application step of applying the slurry for a non-aqueous secondary battery set forth above onto a surface of a substrate by an inkjet method, wherein the substrate is a separator substrate or an electrode substrate. According to the present disclosure, an adhesive material can be efficiently provided at a substrate surface because it is possible to stably apply a slurry for a non-aqueous secondary battery onto the substrate surface by an inkjet method, and, as a result, production efficiency of a battery member for a secondary battery can be increased.

The presently disclosed method of producing a battery member for a non-aqueous secondary battery preferably further comprises a slurry degassing step of reducing the dissolved carbon dioxide gas concentration of the slurry for a non-aqueous secondary battery set forth above before the application step. By reducing the dissolved carbon dioxide gas concentration of the slurry for a non-aqueous secondary battery in the slurry degassing step, the coatability of the slurry for a non-aqueous secondary battery that is used in the application step can be further improved.

In the presently disclosed method of producing a battery member for a non-aqueous secondary battery, it is preferable that a substrate production apparatus including at least a degassing module that reduces the dissolved carbon dioxide gas concentration of the slurry for a non-aqueous secondary battery, an inkjet head that ejects the slurry for a non-aqueous secondary battery, and a supply tank that supplies the slurry for a non-aqueous secondary battery to the inkjet head is used, and the slurry for a non-aqueous secondary battery is circulated, in order, in the supply tank, the degassing module, and the inkjet head. By using a substrate production apparatus that includes at least a supply tank, a degassing module, and an inkjet head and by circulating the slurry for a non-aqueous secondary battery in the supply tank, the degassing module, and the inkjet head, in order, the dissolved carbon dioxide gas concentration of the slurry for a non-aqueous secondary battery can be inhibited from rising, and reduction of coatability of the slurry for a non-aqueous secondary battery can be prevented.

Moreover, the present disclosure aims to advantageously solve the problems set forth above, and a presently disclosed non-aqueous secondary battery comprises the battery member for a non-aqueous secondary battery set forth above. Through inclusion of the presently disclosed battery member for a non-aqueous secondary battery in a non-aqueous secondary battery, it is possible to provide a non-aqueous secondary battery in which battery members are strongly adhered.

Advantageous Effect

According to the present disclosure, it is possible to provide a slurry for a non-aqueous secondary battery that can inhibit nozzle clogging and can stably be applied onto a battery member surface even in a situation in which an inkjet method is adopted, and also to provide a method of producing this slurry for a non-aqueous secondary battery.

Moreover, according to the present disclosure, it is possible to provide a battery member for a non-aqueous secondary battery that can strongly adhere to another adjacent battery member, and also to provide a method of producing this battery member for a non-aqueous secondary battery.

Furthermore, according to the present disclosure, it is possible to provide a non-aqueous secondary battery in which battery members are strongly adhered.

DETAILED DESCRIPTION

The following provides a detailed description of embodiments of the present disclosure.

The presently disclosed slurry for a non-aqueous secondary battery (hereinafter, also referred to simply as a "slurry for a secondary battery") can be used in formation of an adhesive material for adhering battery members at a battery member surface. Specifically, the presently disclosed slurry for a non-aqueous secondary battery can be used to produce the presently disclosed battery member for a non-aqueous secondary battery and the presently disclosed non-aqueous secondary battery. Moreover, the presently disclosed slurry for a non-aqueous secondary battery can be obtained through the presently disclosed method of producing a slurry for a non-aqueous secondary battery.

(Method of Producing Slurry for Non-Aqueous Secondary Battery)

The presently disclosed method of producing a slurry for a secondary battery includes a degassing step of reducing the dissolved carbon dioxide gas concentration of a mixture that contains a particulate polymer (A) and water and that optionally further contains a particulate polymer (B) and other components described further below.

<Particulate Polymer (A)>

The particulate polymer (A) is a component that functions as a binder in an adhesive material that adheres battery members such as a separator and an electrode. By using the particulate polymer (A) as a binder, battery members can be strongly adhered via the adhesive material.

[Composition]

Examples of monomers that can be used to produce the particulate polymer (A) include vinyl chloride monomers such as vinyl chloride and vinylidene chloride; vinyl acetate monomers such as vinyl acetate; aromatic vinyl monomers such as styrene, α-methylstyrene, butoxystyrene, and vinylnaphthalene; vinylamine monomers such as vinylamine; vinylamide monomers such as N-vinylformamide and N-vinylacetamide; (meth)acrylic acid ester monomers such as methyl acrylate, ethyl acrylate, butyl acrylate (n-butyl acrylate, etc.), 2-ethylhexyl acrylate, methyl methacrylate, ethyl methacrylate, butyl methacrylate, and cyclohexyl methacrylate; (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate and 2-(perfluorobutyl)ethyl acrylate; maleimide; and maleimide derivatives such as phenylmaleimide. One of these monomers may be used individually, or two or more of these monomers may be used in combination in a freely selected ratio. Moreover, acid group-containing monomers, hydroxy group-containing monomers, and cross-linkable monomers such as described in detail further below can be used as monomers used to produce the particulate polymer (A).

Note that in the present disclosure, "(meth)acryl" is used to indicate "acryl" and/or "methacryl", whereas "(meth)acrylonitrile" is used to indicate "acrylonitrile" and/or "methacrylonitrile".

<<Core-Shell Structure>>

The particulate polymer (A) may have any particle structure so long as it has a particulate form in water, but preferably has a core-shell structure including a core portion and a shell portion covering an outer surface of the core portion. Note that the shell portion may completely cover the outer surface of the core portion or may partially cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, a particulate polymer (A) including a shell portion that has fine pores passing from an outer surface of the shell portion (i.e., a circumferential surface of the particulate polymer (A)) to an outer surface of a core portion is considered to be a particulate polymer (A) in which a shell portion partially covers the outer surface of a core portion.

—Composition of Core Portion—

Examples of monomers that can be used to produce the core portion of the particulate polymer (A) include the same monomers as previously described. Of these monomers, the use of either or both of an aromatic vinyl monomer and a (meth)acrylic acid ester monomer is preferable, and the use of both of an aromatic vinyl monomer and a (meth)acrylic acid ester monomer is more preferable from a viewpoint of more strongly adhering battery members via the adhesive material. In other words, the core portion of the particulate polymer (A) preferably includes either or both of an aromatic vinyl monomer unit and a (meth)acrylic acid ester monomer unit, and more preferably includes both of an aromatic vinyl monomer unit and a (meth)acrylic acid ester monomer unit. It is even more preferable that the core portion includes a monomer unit derived from styrene and a monomer unit derived from n-butyl acrylate.

The phrase "includes a monomer unit" as used in the present disclosure means that "a polymer obtained with the monomer includes a repeating unit derived from the monomer".

The proportion constituted by an aromatic vinyl monomer unit in the core portion of the particulate polymer (A) when all repeating units (all monomer units) included in the core portion of the particulate polymer (A) are taken to be 100 mass % is, from a viewpoint of more strongly adhering battery members via the adhesive material, preferably 50 mass % or more, more preferably 60 mass % or more, and even more preferably 75 mass % or more, and is preferably 95 mass % or less, and more preferably 90 mass % or less.

Moreover, the proportion constituted by a (meth)acrylic acid ester monomer unit in the core portion of the particulate polymer (A) when all repeating units (all monomer units) included in the core portion of the particulate polymer (A) are taken to be 100 mass % is, from a viewpoint of even more strongly adhering battery members via the adhesive material, preferably 2 mass % or more, more preferably 3 mass % or more, and even more preferably 4 mass % or more, and is preferably 20 mass % or less, more preferably 15 mass % or less, and even more preferably 10 mass % or less.

Note that the proportion constituted by each monomer unit can be measured by a nuclear magnetic resonance (NMR) method such as $^1$H-NMR.

The core portion of the particulate polymer (A) may include an acid group-containing monomer unit. Examples of acid group-containing monomers that can form an acid group-containing monomer unit include monomers having an acid group such as carboxy group-containing monomers, sulfo group-containing monomers, and phosphate group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", whereas "(meth)acryloyl" is used to indicate "acryloyl" and/or "methacryloyl".

Of these acid group-containing monomers, carboxy group-containing monomers are preferable, of which, monocarboxylic acids are more preferable, and (meth)acrylic acid is even more preferable.

One acid group-containing monomer may be used individually, or two or more acid group-containing monomers may be used in combination in a freely selected ratio.

The proportion constituted by an acid group-containing monomer unit in the core portion of the particulate polymer (A) when all repeating units (all monomer units) included in the core portion of the particulate polymer (A) are taken to be 100 mass % is preferably 0.1 mass % or more, and more preferably 1 mass % or more, and is preferably 15 mass % or less, and more preferably 10 mass % or less. By setting the proportion constituted by an acid group-containing monomer unit within any of the ranges set forth above, it is possible to increase dispersibility of the polymer of the core portion during production of the particulate polymer (A) and to facilitate formation of a shell portion on the outer surface of the polymer of the core portion that partially covers the outer surface of the core portion.

The core portion of the particulate polymer (A) may include a hydroxy group-containing monomer unit.

Examples of hydroxy group-containing monomers that can form a hydroxy group-containing monomer unit include 2-hydroxyethyl acrylate, 2-hydroxypropyl acrylate, 2-hydroxyethyl methacrylate, and 2-hydroxypropyl methacrylate. One of these hydroxy group-containing monomers may be used individually, or two or more of these hydroxy group-containing monomers may be used in combination in a freely selected ratio.

The proportion constituted by a hydroxy group-containing monomer unit in the core portion of the particulate polymer (A) when all repeating units (all monomer units) included in the core portion of the particulate polymer (A) are taken to be 100 mass % is preferably 0.1 mass % or more, and more preferably 1 mass % or more, and is preferably 15 mass % or less, and more preferably 10 mass % or less. By setting the proportion constituted by a hydroxy group-containing monomer unit within any of the ranges set forth above, it is possible to increase dispersibility of the polymer of the core portion during production of the particulate polymer (A) and to facilitate formation of a shell portion on the outer surface of the core portion of the particulate polymer (A) that partially covers the outer surface of the core portion.

The core portion of the particulate polymer (A) preferably includes a cross-linkable monomer unit in addition to the monomer units described above. A cross-linkable monomer that can form a cross-linkable monomer unit is a monomer that can form a cross-linked structure during or after polymerization by heating or by irradiation with energy rays. The inclusion of a cross-linkable monomer unit in the particulate polymer (A) makes it easy to set the subsequently described proportion of tetrahydrofuran (THF) insoluble content and degree of swelling in electrolyte solution of the particulate polymer (A) within suitable ranges.

Examples of cross-linkable monomers include polyfunctional monomers having at least two groups that display polymerization reactivity in the cross-linkable monomer. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth)acrylic acid ester monomers such as trimethylolpropane trimethacrylate and trimethylolpropane triacrylate; ethylenically unsaturated monomers that include an epoxy group such as allyl glycidyl ether and glycidyl methacrylate; and γ-methacryloxypropyltrimethoxysilane. Of these cross-linkable monomers, di(meth)acrylic acid ester monomers are more preferable from a viewpoint of easily controlling the proportion of THF-insoluble content and degree of swelling in electrolyte solution of the particulate polymer (A). One of these cross-linkable monomers may be used individually, or two or more of these cross-linkable monomers may be used in combination in a freely selected ratio.

The proportion constituted by a cross-linkable monomer unit in the core portion of the particulate polymer (A) when all repeating units (all monomer units) included in the core portion of the particulate polymer (A) are taken to be 100 mass % is preferably 0.1 mass % or more, more preferably 0.2 mass % or more, and even more preferably 0.5 mass % or more, and is preferably 10 mass % or less, more preferably 5 mass % or less, and even more preferably 3 mass % or less. By setting the proportion constituted by a cross-linkable monomer unit within any of the ranges set forth above, battery members can be even more strongly adhered via the adhesive material while also controlling the proportion of THF-insoluble content and degree of swelling in electrolyte solution of the particulate polymer (A) and improving low-temperature output characteristics of a secondary battery.

—Composition of Shell Portion—

Examples of monomers that can be used to form the shell portion of the particulate polymer (A) include the same monomers as given as examples of monomers that can be used to form the core portion of the particulate polymer (A). One of such monomers may be used individually, or two or more of such monomers may be used in combination in a freely selected ratio.

Of these monomers, the use of either or both of a (meth)acrylic acid ester monomer and an aromatic vinyl monomer as monomers for producing the shell portion of the particulate polymer (A) is preferable, and the use of both of a (meth)acrylic acid ester monomer and an aromatic vinyl monomer as monomers for producing the shell portion of the particulate polymer (A) is more preferable from a viewpoint of even more strongly adhering battery members via the adhesive material. In other words, the shell portion of the particulate polymer (A) preferably includes either or both of a (meth)acrylic acid ester monomer unit and an aromatic vinyl monomer unit, and more preferably includes both of a (meth)acrylic acid ester monomer unit and an aromatic vinyl monomer unit. It is even more preferable that the shell portion includes a monomer unit derived from n-butyl acrylate and a monomer unit derived from styrene.

The proportion constituted by a (meth)acrylic acid ester monomer unit in the shell portion of the particulate polymer (A) when all repeating units (all monomer units) included in the shell portion of the particulate polymer (A) are taken to be 100 mass % is, from a viewpoint of even more strongly adhering battery members via the adhesive material, preferably 10 mass % or more, more preferably 30 mass % or more, and even more preferably 50 mass % or more, and is preferably 95 mass % or less, more preferably 90 mass % or less, and even more preferably 85 mass % or less.

Moreover, the proportion constituted by an aromatic vinyl monomer unit in the shell portion of the particulate polymer (A) when all repeating units (all monomer units) included in the shell portion of the particulate polymer (A) are taken to be 100 mass % is, from a viewpoint of even more strongly adhering battery members via the adhesive material, preferably 5 mass % or more, more preferably 10 mass % or more, and even more preferably 15 mass % or more, and is preferably 40 mass % or less, more preferably 30 mass % or less, and even more preferably 25 mass % or less.

Besides a (meth)acrylic acid ester monomer unit and an aromatic vinyl monomer unit, the shell portion of the particulate polymer (A) may include an acid group-containing monomer unit. Examples of acid group-containing monomers that can form an acid group-containing monomer unit include monomers having an acid group such as carboxy group-containing monomers, sulfo group-containing monomers, and phosphate group-containing monomers. Specifically, examples of acid group-containing monomers that can be used include the same monomers as the acid group-containing monomers that can be used to form the core portion.

Of these acid group-containing monomers, carboxy group-containing monomers are preferable, of which, monocarboxylic acids are more preferable, and (meth)acrylic acid is even more preferable.

One acid group-containing monomer may be used individually, or two or more acid group-containing monomers may be used in combination in a freely selected ratio.

The proportion constituted by an acid group-containing monomer unit in the shell portion of the particulate polymer (A) when all repeating units (all monomer units) included in the shell portion of the particulate polymer (A) are taken to be 100 mass % is preferably 0.1 mass % or more, more preferably 0.4 mass % or more, and even more preferably 0.7 mass % or more, and is preferably 15 mass % or less, more preferably 10 mass % or less, and even more preferably 5 mass % or less.

By setting the proportion constituted by an acid group-containing monomer unit within any of the ranges set forth above, dispersibility of the particulate polymer (A) can be improved, and battery members can be even more strongly adhered via the adhesive material.

The shell portion of the particulate polymer (A) may include a hydroxy group-containing monomer unit.

Examples of hydroxy group-containing monomers that can form a hydroxy group-containing monomer unit in the shell portion of the particulate polymer (A) include the same monomers as the hydroxy group-containing monomers that can be used to form the core portion of the particulate polymer (A).

The proportion constituted by a hydroxy group-containing monomer unit in the shell portion of the particulate polymer (A) when all repeating units (all monomer units) included in the shell portion of the particulate polymer (A) are taken to be 100 mass % is preferably 0.1 mass % or more, more preferably 0.4 mass % or more, and even more preferably 0.7 mass % or more, and is preferably 15 mass % or less, more preferably 10 mass % or less, and even more preferably 5 mass % or less. By setting the proportion constituted by a hydroxy group-containing monomer unit within any of the ranges set forth above, dispersibility of the particulate polymer (A) can be improved, and battery members can be even more strongly adhered via the adhesive material.

The shell portion of the particulate polymer (A) may include a cross-linkable monomer unit. Examples of cross-linkable monomers that can form a cross-linkable monomer unit include the same monomers as given as examples of cross-linkable monomers that can be used to form the core portion of the particulate polymer (A). Of these cross-linkable monomers, di(meth)acrylic acid ester monomers and divinyl monomers are preferable, with allyl methacrylate, for example, being preferable. One cross-linkable monomer may be used individually, or two or more cross-linkable monomers may be used in combination in a freely selected ratio.

The proportion constituted by a cross-linkable monomer unit in the shell portion of the particulate polymer (A) when all repeating units (all monomer units) included in the shell portion of the particulate polymer (A) are taken to be 100 mass % is preferably 0.05 mass % or more, more preferably 0.1 mass % or more, and even more preferably 0.2 mass % or more, and is preferably 4 mass % or less, more preferably 3 mass % or less, and even more preferably 2 mass % or less.

Note that the particulate polymer (A) may include any constituent element other than the core portion and the shell portion described above so long as the expected effects are not significantly lost as a result. Specifically, the particulate polymer (A) may, for example, include a portion inside of the core portion that is formed of a different polymer to the core portion. In one specific example, a residual seed particle may be present inside of the core portion in a situation in which seed particles are used in production of the particulate polymer (A) by seeded polymerization. However, from a viewpoint of more noticeably displaying the expected effects, it is preferable that the particulate polymer (A) is composed of only the core portion and the shell portion.

[Glass-Transition Temperature]

The glass-transition temperature of the particulate polymer (A) is preferably −50° C. or higher, more preferably −20° C. or higher, and even more preferably 0° C. or higher, and is preferably 200° C. or lower, more preferably 150° C. or lower, and even more preferably 110° C. or lower. When the glass-transition temperature of the particulate polymer (A) is −50° C. or higher, battery members can be even more strongly adhered via the adhesive material. On the other hand, when the glass-transition temperature of the particulate polymer (A) is 200° C. or lower, polymerization stability of the particulate polymer (A) can be ensured.

Note that the glass-transition temperature of the particulate polymer (A) can be adjusted by altering the types and/or proportions of monomers used to produce the particulate polymer (A), for example.

—Glass-Transition Temperature of Core Portion—

In a case in which the particulate polymer (A) has a core-shell structure, suitable ranges for the glass-transition temperature of a polymer of the core portion can be set as the same ranges as for the glass-transition temperature of the particulate polymer (A) described above.

Note that the glass-transition temperature of the core portion of the particulate polymer (A) can be adjusted by altering the types and/or proportions of monomers used to produce the core portion of the particulate polymer (A), for example.

—Glass-Transition Temperature of Shell Portion—

In a case in which the particulate polymer (A) has a core-shell structure, the glass-transition temperature of the shell portion of the particulate polymer (A) is preferably −50° C. or higher, more preferably −45° C. or higher, and even more preferably −40° C. or higher, and is preferably 60° C. or lower, more preferably 50° C. or lower, and even more preferably 40° C. or lower. When the glass-transition temperature of the shell portion of the particulate polymer (A) is −50° C. or higher, low-temperature output characteristics of a secondary battery can be further improved. On the other hand, when the glass-transition temperature of the shell portion of the particulate polymer (A) is 60° C. or lower, battery members can be even more strongly adhered via the adhesive material.

Note that the glass-transition temperature of the shell portion of the particulate polymer (A) can be adjusted by altering the types and/or proportions of monomers used to produce the shell portion of the particulate polymer (A), for example.

Moreover, from a viewpoint of more strongly adhering battery members via the adhesive material, the glass-transition temperature of the shell portion of the particulate polymer (A) is preferably at least 10° C. lower than the glass-transition temperature of the core portion of the particulate polymer (A) described above, more preferably at least 30° C. lower than the glass-transition temperature of the core portion, even more preferably at least 50° C. lower than the glass-transition temperature of the core portion, and most preferably at least 100° C. lower than the glass-transition temperature of the core portion.

{Proportion of Insoluble Content}

The proportion of tetrahydrofuran (THF) insoluble content in the particulate polymer (A) is preferably 80 mass % or more, more preferably 82 mass % or more, and even more preferably 85 mass % or more, and is preferably 99 mass % or less, more preferably 95 mass % or less, and even more preferably 90 mass % or less. When the proportion of THF-insoluble content in the particulate polymer (A) is 80 mass % or more, low-temperature output characteristics of a secondary battery can be further improved. On the other hand, when the proportion of THF-insoluble content in the particulate polymer (A) is 99 mass % or less, battery members can be even more strongly adhered via the adhesive material.

Note that the "proportion of THF-insoluble content" referred to in the present disclosure can be measured by a measurement method described in the EXAMPLES section of the present specification.

Also note that the proportion of THF-insoluble content in the particulate polymer (A) can be adjusted by altering the types and/or proportions of monomers used to produce the particulate polymer (A), for example.

{Volume-Average Particle Diameter}

The volume-average particle diameter of the particulate polymer (A) is preferably 100 nm or more, more preferably 200 nm or more, and even more preferably 300 nm or more, and is preferably 1,000 nm or less, more preferably 700 nm or less, and even more preferably 500 nm or less. When the volume-average particle diameter of the particulate polymer (A) is 100 nm or more, battery members can be even more strongly adhered via the adhesive material. On the other hand, when the volume-average particle diameter of the particulate polymer (A) is 1,000 nm or less, nozzle clogging can be further inhibited in a situation in which an inkjet method is adopted, and the adhesive material can be more efficiently provided at a battery member surface.

Note that the "volume-average particle diameter" referred to in the present disclosure represents the particle diameter at which, in a particle diameter distribution by volume measured by laser diffraction, cumulative volume calculated from a small diameter end of the distribution reaches 50%. The "volume-average particle diameter" can be measured by a measurement method described in the EXAMPLES section of the present specification.

Moreover, the volume-average particle diameter of the particulate polymer (A) can be adjusted by altering the types and/or amounts of a polymerization initiator and/or emulsifier used in production of the particulate polymer (A), for example.

{Degree of Swelling in Electrolyte Solution}

The degree of swelling in electrolyte solution of the particulate polymer (A) is preferably a factor of 1.01 or more, more preferably a factor of 1.1 or more, and even more preferably a factor of 1.2 or more, and is preferably a factor of 20 or less, more preferably a factor of 15 or less, and even more preferably a factor of 10 or less. When the degree of swelling in electrolyte solution of the particulate polymer (A) is preferably a factor of 1.01 or more, battery members can be even more strongly adhered (particularly in electrolyte solution) via the adhesive material. On the other hand, when the degree of swelling in electrolyte solution of the particulate polymer (A) is a factor of 20 or less, low-temperature output characteristics of a secondary battery can be further improved.

Note that the "degree of swelling in electrolyte solution" referred to in the present disclosure can be measured by a measurement method described in the EXAMPLES section of the present specification.

Also note that the degree of swelling in electrolyte solution of the particulate polymer (A) can be adjusted by altering the types and/or proportions of monomers used to produce the particulate polymer (A), for example.

<<Production Method of Particulate Polymer (A)>>

The particulate polymer (A) can be produced by polymerizing the previously described monomers. The polymerization method can be any of emulsion polymerization, suspension polymerization, bulk polymerization, and solution polymerization, for example, of which, emulsion polymerization is preferable. In a case in which the particulate polymer (A) has the previously described core-shell structure, the particulate polymer (A) can be produced using monomers for forming the core portion of the particulate polymer (A) and monomers for forming the shell portion of the particulate polymer (A) by performing stepwise polymerization in which the ratio of these monomers is changed over time. Specifically, a polymer (A) having a core-shell structure can be produced by continuous, multi-step emulsion polymerization or multi-step suspension polymerization in which a polymer of a preceding step is sequentially covered by a polymer of a subsequent step.

The following describes one example of a case in which a particulate polymer (A) having the previously described core-shell structure is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)propionamide) or 2,2'-azobis(2-amidinopropane) hydrochloride may be used as a polymerization initiator.

The polymerization procedure involves initially mixing monomers for forming the core portion of the particulate polymer (A) and the emulsifier, and then performing emulsion polymerization as one batch to obtain a particulate polymer that forms the core portion of the particulate polymer (A). The particulate polymer (A) having the previously described core-shell structure can then be obtained by performing polymerization of monomers for forming the shell portion of the particulate polymer (A) in the presence of the particulate polymer forming the core portion of the particulate polymer (A).

In a case where a particulate polymer (A) in which a shell portion partially covers the outer surface of a core portion is to produced, it is preferable that the monomers for forming the shell portion of the particulate polymer (A) are supplied into the polymerization system continuously or divided into a plurality of portions. As a result of the monomers for forming the shell portion of the particulate polymer (A) being supplied into the polymerization system in portions or continuously, a polymer that forms the shell portion of the particulate polymer (A) can be formed as particles that bond to the core portion such as to form a shell portion that partially covers the core portion.

<Water>

The water used in the presently disclosed method of producing a slurry for a secondary battery is a component that functions as a dispersion medium for dispersing the particulate polymer (A). No specific limitations are placed on the water so long as it enables dispersion of the particulate polymer (A).

The amount of water that is used per 100 parts by mass of the particulate polymer (A) in the presently disclosed method of producing a slurry for a secondary battery is preferably 230 parts by mass or more, more preferably 390 parts by mass or more, and even more preferably 900 parts by mass or more, and is preferably 9,900 parts by mass or less, more preferably 3,300 parts by mass or less, and even more preferably 1,900 parts by mass or less. When the amount of water that is used is not less than any of the lower limits set forth above, nozzle clogging can be further inhibited during application of the slurry for a secondary battery by an inkjet method.

<Particulate Polymer (B)>

No specific limitations are placed on the particulate polymer (B) that can optionally be used in the presently disclosed method of producing a slurry for a non-aqueous secondary battery so long as it is a different particulate polymer to the particulate polymer (A). The particulate polymer (B) is a component that is expected to function as a binder in the adhesive material that adheres particles of the particulate polymer (A). By using the particulate polymer (B) as a binder, particles of the particulate polymer (A) can be strongly adhered, and thus battery members can be strongly adhered via the adhesive material. Examples of polymers that can form the particulate polymer (B) include fluoropolymers such as polyvinylidene fluoride (PVdF) and polyvinylidene fluoride-hexafluoropropylene (PVdF-HFP) copolymer; conjugated diene polymers such as styrene-butadiene copolymer (SBR) and acrylonitrile-butadiene copolymer (NBR); hydrogenated conjugated diene polymers; and polymers including a (meth)acrylic acid alkyl ester monomer unit (acrylic polymers). Note that one type of particulate polymer (B) may be used individually, or two or more types of particulate polymers (B) may be used in combination in a freely selected ratio.

Also note that as a result of the dissolved carbon dioxide gas concentration of the mixture being reduced in the presently disclosed method of producing a slurry for a secondary battery, nozzle clogging can be inhibited during application of a slurry for a secondary battery by an inkjet method even in a case in which the particulate polymer (B) is also used in the method of producing a slurry for a secondary battery.

The glass-transition temperature of the particulate polymer (B) is preferably −40° C. or higher, more preferably −30° C. or higher, and even more preferably −20° C. or higher, and is preferably 20° C. or lower, more preferably 15° C. or lower, and even more preferably 10° C. or lower. Low-temperature output characteristics of a secondary battery can be further improved when the glass-transition temperature of the particulate polymer (B) is −40° C. or higher, whereas dusting resistance of the adhesive material can be improved when the glass-transition temperature of the particulate polymer (B) is 20° C. or lower.

[Volume-Average Particle Diameter]

The volume-average particle diameter of the particulate polymer (B) is preferably 100 nm or more, more preferably 200 nm or more, and even more preferably 300 nm or more, and is preferably 1,000 nm or less, more preferably 700 nm or less, and even more preferably 500 nm or less. When the volume-average particle diameter of the particulate polymer (B) is 100 nm or more, the desired characteristics of the particulate polymer (B) can be sufficiently displayed. Moreover, when the volume-average particle diameter of the particulate polymer (B) is 1,000 nm or less, nozzle clogging caused by the particulate polymer (B) can be sufficiently inhibited even in a situation in which an inkjet method is adopted.

Note that the volume-average particle diameter of the particulate polymer (B) can be adjusted by altering the types and/or amounts of a polymerization initiator and/or emulsifier used in production of the particulate polymer (B), for example.

The amount of the particulate polymer (B) that is used per 100 parts by mass of the particulate polymer (A) is preferably 1 part by mass or more, more preferably 5 parts by mass or more, and even more preferably 10 parts by mass or more, and is preferably 30 parts by mass or less, more preferably 25 parts by mass or less, and even more preferably 20 parts by mass or less. When the used amount of the particulate polymer (B) is not less than any of the lower limits set forth above, dusting resistance of an adhesive material formed using the presently disclosed slurry for a secondary battery can be further improved. Moreover, when the used amount of the particulate polymer (B) is not more than any of the upper limits set forth above, low-temperature output characteristics can be further improved.

<<Production Method of Particulate Polymer (B)>>

No specific limitations are placed on the method by which the particulate polymer (B) is produced. For example, the particulate polymer (B) can be obtained through emulsion polymerization of a monomer mixture containing monomers that can form the particulate polymer (B). Conventional and commonly known emulsion polymerization methods can be adopted without any specific limitations as the method of emulsion polymerization.

<Other Components>

No specific limitations are placed on other components that can optionally be used in the presently disclosed method of producing a slurry for a secondary battery so long as they are components other than the above-described particulate polymer (A), particulate polymer (B), and water. Examples of such components include polyhydric alcohol compounds and additives.

<Polyhydric Alcohol Compound>

A polyhydric alcohol compound is a compound that includes at least two hydroxy groups (—OH) in a single molecule. Through inclusion of a polyhydric alcohol compound in the presently disclosed slurry for a secondary battery, it is possible to further inhibit nozzle clogging during application of the slurry for a secondary battery onto a battery member surface by an inkjet method and to more efficiently provide an adhesive material at the battery member surface. Although it is not clear why nozzle clogging can be inhibited during application by an inkjet method as a result of the slurry for a secondary battery containing a polyhydric alcohol compound, the reason for this is thought to be as follows. The polyhydric alcohol compound having a plurality of hydroxy groups in a single molecule is thought to function as a humectant to thereby inhibit evaporation of water in the slurry for a secondary battery inside a nozzle (particularly evaporation of water inside the nozzle during standing time while application is temporarily suspended), and, as a result, inhibit precipitation of the particulate polymer (A) and the like.

The polyhydric alcohol compound may, for example, be propylene glycol, ethylene glycol, glycerin, 1,3-propanediol, 1,4-butanediol, glucose, fructose, cellulose, or the like. One of these polyhydric alcohol compounds may be used individually, or two or more of these polyhydric alcohol compounds may be used in combination in a freely selected ratio. Of these polyhydric alcohol compounds, propylene glycol, ethylene glycol, glycerin, 1,3-propanediol, and 1,4-butanediol are preferable from a viewpoint of further inhibiting nozzle clogging during application of a slurry for a non-aqueous secondary battery by an inkjet method and even more efficiently providing an adhesive material at a battery member surface, with propylene glycol, ethylene glycol, and glycerin being more preferable.

The amount of the polyhydric alcohol compound that is used per 100 parts by mass of the particulate polymer (A) is preferably 10 parts by mass or more, more preferably 20 parts by mass or more, and even more preferably 30 parts by mass or more, and is preferably 400 parts by mass or less, more preferably 300 parts by mass or less, and even more preferably 200 parts by mass or less. When the used amount of the polyhydric alcohol compound is within any of the ranges set forth above, nozzle clogging can be sufficiently inhibited during application of a slurry for a non-aqueous secondary battery by an inkjet method.

<<Additives>>

Examples of additives that can be used in the presently disclosed method of producing a slurry for a secondary battery include, but are not specifically limited to, surface tension modifiers, dispersants, viscosity modifiers, reinforcing materials, and additives for electrolyte solution. These additives are not specifically limited so long as they do not affect battery reactions and may be selected from commonly known additives such as those described in WO2012/115096A1. Note that one of these additives may be used individually, or two or more of these additives may be used in combination in a freely selected ratio.

<Degassing Step>

In the degassing step of the presently disclosed method of producing a slurry for a secondary battery, the dissolved carbon dioxide gas concentration of the mixture containing the components described above is reduced. This makes it possible to obtain a slurry for a secondary battery that can inhibit nozzle clogging and can stably be applied onto a battery member surface even in a situation in which an inkjet method is adopted compared to when the mixture is used in that form without performing degassing. Note that the term "dissolved carbon dioxide gas" as used in the present disclosure refers to carbon dioxide that is dissolved in a slurry for a secondary battery.

Although it is not clear why coatability of a slurry for a secondary battery obtained through the presently disclosed production method is stabilized, it is presumed that reducing the dissolved carbon dioxide gas concentration of the mixture stabilizes dispersibility of the particulate polymer (A) in the mixture and inhibits aggregation of the particulate polymer (A).

The mixture typically contains carbon dioxide gas in a concentration of 0.1 mg/mL or more.

In the degassing step, degassing is performed until the dissolved carbon dioxide gas concentration of the mixture is preferably 0.01 mg/mL or more, and more preferably 0.02 mg/mL or more, and is preferably 0.08 mg/mL or less, and more preferably 0.06 mg/mL or less. When the dissolved carbon dioxide gas concentration of the mixture becomes not less than any of the lower limits set forth above, aggregation of the particulate polymer (A) can be inhibited. Moreover, by performing degassing until the dissolved carbon dioxide gas concentration of the mixture is within any of the ranges set forth above, a slurry for a secondary battery having further improved coatability is obtained. Furthermore, by performing degassing until the dissolved carbon dioxide gas concentration of the mixture is not less than any of the lower limits set forth above in a case in which the slurry for a secondary battery contains the previously described particulate polymer (B), particulate polymer aggregation through adsorption of the particulate polymer (B) by the particulate polymer (A) can be inhibited.

Note that the "dissolved carbon dioxide gas concentration" of a slurry for a secondary battery referred to in the present disclosure can be measured by a measurement method described in the EXAMPLES section of the present specification.

The mixing can be performed using a typical stirring vessel, ball mill, sand mill, bead mill, pigment disperser, ultrasonic disperser, grinding machine, homogenizer, planetary mixer, FILMIX, or the like. Although no specific limitations are placed on the mixing conditions, mixing can typically be performed in a temperature range of room temperature (25° C.) to 80° C. for a period of 10 minutes to several hours.

The method of degassing the mixture is not specifically limited so long as it can reduce the dissolved carbon dioxide gas concentration of the mixture, and commonly known degassing methods such as heated degassing, reduced pressure degassing, and degassing through defoamer addition can be used.

In a case in which heated degassing is performed, the mixture is typically heated at rest under normal pressure (1 atm) to a temperature of preferably 30° C. or higher, and more preferably 35° C. or higher, and of preferably 50° C. or lower, and more preferably 40° C. or lower. When the heating temperature is not lower than any of the lower limits set forth above, the dissolved carbon dioxide gas concentration of the mixture can easily be adjusted to within any of the previously described ranges. Moreover, when the heating temperature is not higher than any of the upper limits set forth above, deterioration under the influence of heat of components in the slurry for a secondary battery, such as the particulate polymer (A), can be inhibited.

The time for which the mixture is left at rest in the heated degassing is normally 1 hour or more, preferably 6 hours or more, and more preferably 12 hours or more, and is preferably 30 hours or less, and more preferably 24 hours or less. When the resting time is not less than any of the lower limits set forth above, the dissolved carbon dioxide gas concentration of the mixture can more easily be adjusted to within any of the previously described ranges. Moreover, when the resting time is not more than any of the upper limits set forth above, the time required for production of a slurry for a secondary battery can be shortened, and production efficiency can be improved.

In a case in which reduced pressure degassing is performed, the mixture is typically depressurized at room temperature (25° C.) to a pressure of preferably about 1.0 kPa to 0.5 kPa and is held thereat under stirring until bubbles no longer form.

In a case in which degassing through defoamer addition is performed, conventional and commonly known defoamers can be used without any specific limitations on the type of defoamer. The additive amount of the defoamer is also not specifically limited and can be set as appropriate.

A slurry for a secondary battery that is obtained through degassing of the mixture is preferably stored in a container that can prevent carbon dioxide gas dissolving therein but is not specifically limited to being stored in this manner.

<Slurry for Non-Aqueous Secondary Battery>

The presently disclosed slurry for a secondary battery, which can be produced by the production method set forth above, contains the previously described particulate polymer (A), water, and, optionally, the previously described particulate polymer (B) and/or other components, and has a dissolved carbon dioxide gas concentration of 0.01 mg/mL or more, and preferably 0.02 mg/mL or more, and of 0.08 mg/mL or less, and preferably 0.06 mg/mL or less. Through the presently disclosed slurry for a secondary battery, it is possible to provide a slurry for a secondary battery having sufficiently stabilized coatability that can effectively inhibit nozzle clogging even in a situation in which an inkjet method is adopted. In other words, the presently disclosed slurry for a secondary battery can be used to efficiently provide an adhesive material at a battery member surface. Moreover, by providing an adhesive material at a battery member surface using the presently disclosed slurry for a secondary battery, battery members can be strongly adhered via the adhesive material.

The total solid content concentration of the slurry for a secondary battery is not specifically limited but is preferably 1 mass % or more, and more preferably 3 mass % or more, and is preferably 30 mass % or less, more preferably 15 mass % or less, and even more preferably 10 mass % or less. When the total solid content concentration of the slurry for a secondary battery is within any of the ranges set forth above, a battery member for a secondary battery can be efficiently produced using the slurry for a secondary battery.

Although no specific limitations are placed on the content of the particulate polymer (A) in the slurry for a secondary battery, when all solid content in the slurry for a secondary battery is taken to be 100 mass %, the content of the particulate polymer (A) is preferably 70 mass % or more, and more preferably 80 mass % or more, and is preferably 95 mass % or less, and more preferably 90 mass % or less. When the content of the particulate polymer (A) in the slurry for a secondary battery is not less than any of the lower limits set forth above, sufficient adhesiveness of the particulate polymer (A) can be obtained. Moreover, when the content of the particulate polymer (A) in the slurry for a secondary battery is not more than any of the upper limits set forth above, coatability of the slurry for a secondary battery stabilizes.

Although no specific limitations are placed on the content of water in the slurry for a secondary battery, the content of water per 100 parts by mass of the particulate polymer (A) is preferably 230 parts by mass or more, more preferably 390 parts by mass or more, and even more preferably 900 parts by mass or more, and is preferably 9,900 parts by mass or less, more preferably 3,300 parts by mass or less, and even more preferably 1,900 parts by mass or less. When the content of water in the slurry for a secondary battery is not less than any of the lower limits set forth above, nozzle clogging can be further inhibited during application of the slurry for a secondary battery by an inkjet method. Moreover, when the content of water in the slurry for a secondary battery is not more than any of the upper limits set forth above, evaporation of water contained in the slurry for a secondary battery does not become excessively difficult, and sufficient drying efficiency of the slurry for a secondary battery can be ensured.

Although no specific limitations are placed on the content of the particulate polymer (B) in the slurry for a secondary battery, the content of the particulate polymer (B) per 100 parts by mass of the particulate polymer (A) is preferably 1 part by mass or more, more preferably 5 parts by mass or more, and even more preferably 10 parts by mass or more, and is preferably 30 parts by mass or less, more preferably 25 parts by mass or less, and even more preferably 20 parts by mass or less. When the content of the particulate polymer (B) in the slurry for a secondary battery is not less than any of the lower limits set forth above, dusting resistance of an adhesive material formed using the presently disclosed slurry for a secondary battery can be improved. Moreover, when the content of the particulate polymer (B) in the slurry for a secondary battery is not more than any of the upper limits set forth above, low-temperature output characteristics can be further improved.

The content of coarse particles of 10 μm or more in diameter in the presently disclosed slurry for a secondary battery is preferably 100 ppm or less, more preferably 50 ppm or less, and even more preferably 10 ppm or less. When the content of coarse particles of 10 μm or more in diameter is 100 ppm or less, battery members can be even more strongly adhered via the adhesive material. Note that coarse particles contained in the slurry for a secondary battery are normally formed of the particulate polymer (A) and/or the particulate polymer (B).

Also note that the "content of coarse particles" referred to in the present disclosure can be measured by the following procedure.

—Measurement of Content of Coarse Particles—

The mass (B) of nylon mesh having an average pore diameter of 10 μm is measured, and then the nylon mesh is set in a funnel. Next, 100 g of the slurry for a secondary battery is poured into the funnel and is filtered. Deionized water is subsequently poured into the funnel to perform washing of trapped material on the nylon mesh until clouding disappears, and then the nylon mesh is dried in a 90° C. oven for at least 60 minutes. The nylon mesh is left to cool and then the mass (A) thereof is measured in order to measure the amount of mesh residue. The amount of mesh residue, which in other words is the amount of coarse particles having a particle diameter of 10 μm or more in the slurry, is determined by the following formula.

$$\text{Content of coarse particles (ppm)} = (A-B)/(C \times D/100) \times 1{,}000{,}000$$

A: Mass of mesh+dried product (g)
B: Mass of mesh (g)
C: Mass of filtered slurry (g)
D: Total solid content concentration of slurry (%)

(Battery Member for Non-Aqueous Secondary Battery)

The presently disclosed battery member for a non-aqueous secondary battery (hereinafter, also referred to simply as a "battery member for a secondary battery") includes a substrate and an adhesive material formed in plurality in a dotted form on at least one surface of the substrate, wherein the substrate is a separator substrate or an electrode substrate, and the adhesive material is a dried product of the slurry for a non-aqueous secondary battery set forth above.

The presently disclosed battery member for a secondary battery can be used as a separator for a secondary battery in a case in which the substrate is a separator substrate and can be used as an electrode for a secondary battery in a case in which the substrate is an electrode substrate.

The substrate including the adhesive material that is a dried product of the presently disclosed slurry for a secondary battery disposed in plurality in a dotted form on at least one surface can be strongly adhered to another battery member (for example, an electrode) by affixing the substrate with the other battery member at the surface where the adhesive material has been formed (or is formed) (hereinafter, this surface is also referred to as a "formation surface").

<Separator Substrate>

Known separator substrates can be used as the separator substrate without any specific limitations. Moreover, the separator substrate may have a porous membrane layer formed at one surface or both surfaces thereof.

Note that the separator substrate and the porous membrane layer can, without any specific limitations, be any separator substrate and porous membrane layer that can be used in the field of secondary batteries, such as any of those described in JP2012-204303A or JP2013-145763A, for example. The porous membrane layer is a layer containing non-conductive particles such as described in JP2013-145763A, for example.

<Electrode Substrate>

Known electrode substrates can be used as the electrode substrate without any specific limitations. For example, an electrode including an electrode substrate that is obtained by forming an electrode mixed material layer at one surface or both surfaces of a current collector or an electrode that further includes a porous membrane layer formed on an electrode mixed material layer of an electrode substrate can be used as the electrode substrate.

Note that the current collector, the electrode mixed material layer, and the porous membrane layer can, without any specific limitations, be any current collector, electrode mixed material layer, and porous membrane layer that can be used in the field of secondary batteries, such as any of those described in JP2013-145763A, for example.

<Adhesive Material>

The adhesive material formed on at least one surface of the substrate described above is a dried product of the presently disclosed slurry for a secondary battery as previously described. In other words, the dried product contains at least a polymer derived from the previously described particulate polymer (A) and can optionally contain a polymer derived from the previously described particulate polymer (B) and/or other components. Although the dried product may contain residual polyhydric alcohol compound and water that have not evaporated through drying, the water content of the adhesive material is preferably 5 mass % or less, more preferably 3 mass % or less, even more preferably 1 mass % or less, particularly preferably 0.5 mass % or less, and most preferably 0 mass % (below the limit of detection).

The dotted adhesive material may be formed uniformly over the entirety of the formation surface or may be formed in an array such as to have a specific pattern, such as a striped pattern, a dotted pattern, or a lattice pattern, in plan view.

The cross-sectional shape of the adhesive material can be a protruding shape, a protruding/depressed shape, or a depressed shape without any specific limitations, and is preferably a protruding/depressed shape from a viewpoint of more strongly adhering the substrate to an adjacent battery member (for example, an electrode) via the adhesive material. Note that the cross-sectional shape of the adhesive material can be altered by adjusting the drying conditions in formation of the adhesive material using the presently disclosed slurry for a secondary battery, for example.

The formed amount of the adhesive material is preferably not less than 0.1 g/m$^2$ and not more than 100 g/m$^2$, more preferably not less than 0.1 g/m$^2$ and not more than 50 g/m$^2$, even more preferably not less than 0.1 g/m$^2$ and not more than 10 g/m$^2$, and particularly preferably not less than 0.1 g/m$^2$ and not more than 1 g/m$^2$. When the formed amount of the adhesive material is 0.1 g/m$^2$ or more, the battery member (for example, a separator) including the adhesive material can be more strongly adhered to an adjacent battery member (for example, an electrode) via the adhesive material. On the other hand, when the formed amount of the adhesive material is 100 g/m$^2$ or less, the battery member for a secondary battery can be efficiently produced.

Note that the "formed amount of the adhesive material" referred to in the present disclosure is the amount of the adhesive material that is formed per unit area of the formation surface and can be calculated by dividing the mass of the adhesive material that is formed on the formation surface by the area of the formation surface on which the adhesive material has been formed.

In a case in which the formation surface has the dotted adhesive material formed at one or more locations, and preferably two or more locations, on the formation surface, the size (area) of one dot formed on the formation surface is preferably 25 $\mu m^2$ or more, more preferably 50 $\mu m^2$ or more, and even more preferably 100 $\mu m^2$ or more, and is preferably 250,000 $\mu m^2$ or less, more preferably 200,000 $\mu m^2$ or less, and even more preferably 100,000 $\mu m^2$ or less. When the size of one dot is 25 $\mu m^2$ or more, the substrate can be more strongly adhered to an adjacent battery member (for example, an electrode) via the adhesive material. Moreover, when the size of one dot is 250,000 $\mu m^2$ or less, the battery member for a secondary battery can be efficiently produced.

Note that the size (area) of one dot formed on the formation surface can be adjusted by altering the amount, shape, and range of supply of the presently disclosed slurry for a secondary battery to the formation surface. Specifically, in a case in which the adhesive material is formed by an inkjet method using the presently disclosed slurry for a secondary battery, for example, the formation area can be adjusted by altering the gradation of ejection of the slurry for a secondary battery from nozzles of an inkjet head (i.e., the number of ejections at the same point).

(Method of Producing Battery Member for Non-Aqueous Secondary Battery)

The presently disclosed method of producing a battery member for a secondary battery comprises an application step of applying the presently disclosed slurry for a secondary battery onto a surface of the previously described substrate by an inkjet method, wherein the substrate is the previously described separator substrate or electrode substrate.

The presently disclosed method of producing a battery member for a secondary battery may optionally further include a slurry degassing step of reducing the dissolved carbon dioxide gas concentration of the presently disclosed slurry for a secondary battery before the application step.

The presently disclosed battery member is obtained by drying the slurry for a secondary battery that has been applied onto the substrate surface. The application conditions and the drying conditions of the slurry for a secondary battery can be adjusted as appropriate depending on the desired plan view shape, cross-sectional shape, formed amount, and formation area per location of the adhesive material.

<Slurry Degassing Step>

In the slurry degassing step that can optionally be included in the presently disclosed method of producing a battery member for a secondary battery, the dissolved carbon dioxide gas concentration of the slurry for a secondary battery that is used in the subsequent application step is reduced. In the slurry degassing step, degassing is performed until the dissolved carbon dioxide gas concentration of the slurry for a secondary battery is preferably 0.01 mg/mL or more, and more preferably 0.02 mg/mL or more, and is preferably 0.08 mg/mL or less, and more preferably 0.06 mg/mL or less. This can inhibit reduction of coatability of the slurry for a secondary battery used in the application step. Note that the method by which the slurry for a secondary battery is degassed in the slurry degassing step is not specifically limited and can be any of the degassing methods that can be used to degas the mixture in the presently disclosed method of producing a slurry for a secondary battery.

<Application Step>

In the application step, the presently disclosed slurry for a secondary battery is applied onto the substrate surface by an inkjet method. The presently disclosed slurry for a secondary battery can be applied onto the substrate surface in a dotted form, for example.

In the presently disclosed method of producing a battery member for a secondary battery, production is preferably performed using a substrate production apparatus including at least a degassing module that reduces the dissolved carbon dioxide gas concentration of the slurry for a non-aqueous secondary battery, an inkjet head that ejects the slurry for a non-aqueous secondary battery, and a supply tank that supplies the slurry for a non-aqueous secondary battery to the inkjet head. In this substrate production apparatus, the slurry for a non-aqueous secondary battery is preferably circulated, in order, in the supply tank, the degassing module, and the inkjet head. In other words, slurry for a secondary battery that has not been ejected from the inkjet head is preferably circulated to the supply tank. By using a substrate production apparatus that includes at least a supply tank, a degassing module, and an inkjet head and by circulating the slurry for a non-aqueous secondary battery in order in the supply tank, the degassing module, and the inkjet head in this manner, production efficiency of a battery member for a secondary battery can be improved.

(Non-Aqueous Secondary Battery)

The presently disclosed secondary battery includes the presently disclosed battery member for a non-aqueous secondary battery set forth above. Specifically, the presently disclosed secondary battery includes the presently disclosed battery member for a non-aqueous secondary battery as at least one of a separator for a secondary battery and an electrode for a secondary battery.

<Electrode>

The presently disclosed battery member for a secondary battery set forth above or a known electrode may serve as an electrode used in the presently disclosed secondary battery.

<Electrolyte Solution>

An organic electrolyte solution obtained by dissolving a supporting electrolyte in an organic solvent is normally used as an electrolyte solution. For example, a lithium salt can be used as the supporting electrolyte in a case in which the secondary battery is a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. Note that one supporting electrolyte may be used individually, or two or more supporting electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples of organic solvents in a case in which the secondary battery is a lithium ion secondary battery include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these organic solvents may be used. Of these solvents, carbonates are preferable due to having high permittivity and a wide stable potential region.

The concentration of the supporting electrolyte in the electrolyte solution may be adjusted as appropriate. Furthermore, known additives may be added to the electrolyte solution.

<Separator>

The presently disclosed battery member for a secondary battery set forth above or a known separator may serve as a separator used in the presently disclosed secondary battery.

<Production Method of Secondary Battery>

The presently disclosed secondary battery can be produced by, for example, performing rolling, folding, or the like, as necessary depending on the battery shape, of a stack obtained through stacking of a positive electrode, a separator, and a negative electrode, placing the stack in a device container, injecting the electrolyte solution into the device container, and sealing the device container. Note that the stack can be produced by performing stacking of the positive electrode, the separator, and the negative electrode in which the presently disclosed battery member for a secondary battery is used as at least one of the positive electrode, the separator, and the negative electrode. In order to prevent internal pressure increase and occurrence of overcharging or overdischarging, an overcurrent preventing device such as a fuse or a PTC device, an expanded metal, a lead plate, or the like may be provided as necessary in the presently disclosed secondary battery. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative example, the following methods were used to measure and evaluate the glass-transition temperature, proportion of THF-insoluble content, volume-average particle diameter, degree of swelling in electrolyte solution, dissolved carbon dioxide gas concentration, and coating stability.

<Glass-Transition Temperature (Tg)>

A particulate polymer (A) and a particulate polymer (B) produced in each example or comparative example were taken as measurement samples. For each of the measurement samples, 10 mg of the measurement sample was measured into an aluminum pan and was then measured in a differential scanning calorimeter (EXSTAR DSC6220 produced by SIT NanoTechnology Inc.) under conditions prescribed by JIS Z 8703 with a measurement temperature range of −100° C. to 500° C. and a heating rate of 10° C./min, and using an empty aluminum pan as a reference, to obtain a differential scanning calorimetry (DSC) curve. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Proportion of THF-Insoluble Content>

A water dispersion of a particulate polymer (A) was dried in an environment of 50% humidity and 23° C. to 25° C. to prepare a film having a thickness of 3±0.3 mm. The prepared film was cut up into 5 mm squares to prepare a plurality of film pieces, approximately 1 g of these film pieces were precisely weighed, and the weight thereof was taken to be W0 (g). The precisely weighed film pieces (weight W0) were immersed in 100 g of tetrahydrofuran (THF) for 24 hours. Thereafter, the film pieces were pulled out of the THF, were subsequently vacuum dried at 105° C. for 3 hours, and then the weight W1 (g) thereof (weight of insoluble content) was precisely weighed. The proportion of THF-insoluble content (mass %) was calculated by the following formula.

Proportion of THF-insoluble content (mass %)=$W1/W0 \times 100$

<Volume-Average Particle Diameter>

A laser diffraction particle diameter distribution analyzer (produced by Beckman Coulter, Inc.; product name: LS-230) was used to measure a particle diameter distribution (by volume) for a water dispersion of a particulate polymer (A) that had been adjusted to a solid content concentration of 0.1 mass %. In the measured particle diameter distribution, the particle diameter at which the cumulative volume calculated from a small-diameter end of the distribution reached 50% was taken to be the volume-average particle diameter (D50).

<Degree of Swelling in Electrolyte Solution>

A water dispersion of a particulate polymer (A) was dried, and then approximately 0.2 g of the resultant dried product was pressed under pressing conditions of 200° C. and 5 MPa for 2 minutes to obtain a film. The obtained film was cut to a 1 cm square to obtain a test specimen, and the weight W2 (g) of the test specimen was measured. Next, the test specimen was immersed in electrolyte solution at 60° C. for 72 hours. Thereafter, the test specimen was removed from the electrolyte solution, electrolyte solution on the surface of the test specimen was wiped off, and the weight W3 (g) of the test specimen was measured. The degree of swelling in electrolyte solution (factor) was calculated by the following formula. Note that the degree of swelling in electrolyte solution was taken to be a value for which rounding up or down was performed from the first decimal place onwards.

Degree of swelling in electrolyte solution (factor)= $W3/W2$

Note that the electrolyte solution used for measurement was an electrolyte solution obtained by dissolving $LiPF_6$ in a concentration of 1 mol/L as a supporting electrolyte in a mixed solvent of ethylene carbonate (EC), diethyl carbonate (DEC), and vinylene carbonate (VC) mixed in a volume ratio of EC/DEC/VC=68.5/30/1.5.

<Dissolved Carbon Dioxide Gas Concentration>

A sample was collected in a syringe, was introduced into an HP6890 gas chromatograph produced by Agilent Technologies, and the dissolved carbon dioxide gas concentration was measured using a thermal conductivity detector. Quantification was performed by preparing a calibration curve using a standard substance with a known concentration.

<Coating Stability>

[Inkjet Coating]

A slurry for a non-aqueous secondary battery was ejected onto black polyester (PET) film using an inkjet-type slurry feeder including an inkjet head (produced by Konica; product name: KM1024iSAE-C (shear-mode type)) under conditions such that the projection velocity was 6 m/s to 10 m/s. The slurry for a non-aqueous secondary battery that had been applied onto the PET film was allowed to naturally dry at room temperature, and the number of application points was visually counted. The coating stability (%) was calculated by the following formula. A coating stability of 90% or more indicates that the slurry for a non-aqueous secondary battery has sufficient coating stability in order to suitably be applied onto a battery member surface by an inkjet method.

Coating stability (%)=(Number of application points/Expected number of applications)×100

Example 1

<Production of Particulate Polymer (A)>

First, in core portion formation, 88 parts of styrene as an aromatic vinyl monomer, 6 parts of n-butyl acrylate as a (meth)acrylic acid ester monomer, 5 parts of methacrylic acid as an acid group-containing monomer, 1 part of ethylene glycol dimethacrylate as a cross-linkable monomer, 1 part of sodium dodecylbenzenesulfonate as an emulsifier, 150 parts of deionized water, and 0.5 parts of potassium persulfate as a polymerization initiator were loaded into a 5 MPa pressure-resistant vessel equipped with a stirrer, were sufficiently stirred, and were then heated to 60° C. to initiate polymerization. At the point at which the polymerization conversion rate reached 96%, 80.7 parts of n-butyl acrylate as a (meth)acrylic acid ester monomer, 1 part of methacrylic acid, 18 parts of styrene as an aromatic vinyl monomer, and 0.3 parts of allyl methacrylate as a cross-linkable monomer were continuously added for shell portion formation, heating was performed to 70° C., and polymerization was continued. At the point at which the polymerization conversion rate reached 96%, the reaction was quenched by cooling to obtain a water dispersion (A) containing a particulate polymer (A). The water dispersion (A) was used to measure the glass-transition temperature (Tg), the THF-insoluble content, the volume-average particle diameter, and the degree of swelling in electrolyte solution of the particulate polymer (A). The results are shown in Table 1.

<Production of Particulate Polymer (B)>

A reactor including a stirrer was charged with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and heating was performed to 60° C.

Meanwhile, a monomer mixture was obtained in a separate vessel by mixing 50 parts of deionized water, 0.5 parts of sodium dodecylbenzenesulfonate as an emulsifier, and 94 parts of n-butyl acrylate, 2 parts of acrylonitrile, 2 parts of methacrylic acid, 1 part of N-hydroxymethylacrylamide, and 1 part of allyl glycidyl ether as polymerizable monomers. The monomer mixture was continuously added to the aforementioned reactor over 4 hours to carry out polymerization. The reaction was carried out at 60° C. during this addition. Once the addition was completed, stirring was carried out at 70° C. for a further 3 hours to complete the reaction and obtain a water dispersion (B) containing an acrylic polymer as a particulate polymer (B). The water dispersion (B) was used to measure the glass-transition temperature (Tg) of the particulate polymer (B). The result is shown in Table 1.

<Slurry for Non-Aqueous Secondary Battery>

Inside a stirring vessel, 100 parts in terms of solid content of the water dispersion (A) containing the particulate polymer (A) and 15 parts in terms of solid content of the water dispersion (B) containing the particulate polymer (B) were mixed. Deionized water was added to the resultant mixed liquid to obtain a mixture having a solid content concentration of 15%. The obtained mixture was heated at rest to a temperature of 35° C. for 1 hour to perform degassing of the mixture. Through this degassing, the dissolved carbon dioxide gas concentration of the mixture was reduced, and a slurry for a non-aqueous secondary battery was obtained. The dissolved carbon dioxide gas concentration in the obtained slurry for a non-aqueous secondary battery was measured, and coating stability of the slurry for a non-aqueous secondary battery was investigated. The results are shown in Table 1.

Example 2

With the exception that the time for which the mixture obtained in Example 1 was heated at rest was changed to 24 hours, degassing of the mixture was performed in the same way as in Example 1. Through this degassing, the dissolved carbon dioxide gas concentration of the mixture was reduced, and a slurry for a non-aqueous secondary battery was obtained. The dissolved carbon dioxide gas concentration in the obtained slurry for a non-aqueous secondary battery was measured, and coating stability of the slurry for a non-aqueous secondary battery was investigated in the same way as in Example 1. The results are shown in Table 1.

Example 3

With the exception that the time for which the mixture obtained in Example 1 was heated at rest was changed to 48 hours, degassing of the mixture was performed in the same way as in Example 1. Through this degassing, the dissolved carbon dioxide gas concentration of the mixture was reduced, and a slurry for a non-aqueous secondary battery was obtained. The dissolved carbon dioxide gas concentration in the obtained slurry for a non-aqueous secondary battery was measured, and coating stability of the slurry for a non-aqueous secondary battery was investigated in the same way as in Example 1. The results are shown in Table 1.

Comparative Example 1

The mixture obtained in Example 1 was used, as obtained, as a slurry for a non-aqueous secondary battery without performing degassing thereof. The dissolved carbon dioxide gas concentration in the obtained slurry for a non-aqueous secondary battery was measured, and coating stability of the slurry for a non-aqueous secondary battery was investigated in the same way as in Example 1. The results are shown in Table 1.

Note that in Table 1, shown below:
"BA" indicates n-butyl acrylate unit;
"MAA" indicates methacrylic acid unit;
"ST" indicates styrene unit;
"AMA" indicates allyl methacrylate unit;
"EDMA" indicates ethylene glycol dimethacrylate unit; and
"ACL" indicates acrylic polymer.

TABLE 1

| Slurry for secondary battery | | | | | Example 1 | Example 2 | Example 3 | Comparative Example 1 |
|---|---|---|---|---|---|---|---|---|
| | Particulate polymer (A) | | Structure | | Core-shell | Core-shell | Core-shell | Core-shell |
| | | Shell | Composition [mass %] | BA | 80.7 | 80.7 | 80.7 | 80.7 |
| | | | | MAA | 1 | 1 | 1 | 1 |
| | | | | ST | 18 | 18 | 18 | 18 |
| | | | | AMA | 0.3 | 0.3 | 0.3 | 0.3 |
| | | | Glass-transition temperature (Tg) [° C.] | | −34 | −34 | −34 | −34 |
| | | Core | Composition [mass %] | ST | 88 | 88 | 88 | 88 |
| | | | | BA | 6 | 6 | 6 | 6 |
| | | | | MAA | 5 | 5 | 5 | 5 |
| | | | | EDMA | 1 | 1 | 1 | 1 |
| | | | Glass-transition temperature (Tg) [° C.] | | 95 | 95 | 95 | 95 |
| | | | Proportion of THF-insoluble content [mass%] | | 85 | 85 | 85 | 85 |
| | | | Volume-average particle diameter [nm] | | 230 | 230 | 230 | 230 |
| | | | Degree of swelling in electrolyte solution [factor] | | 1 | 1 | 1 | 1 |
| | Particulate polymer (B) | | Type | | ACL | ACL | ACL | ACL |
| | | | Glass-transition temperature (Tg)[° C.] | | 5 | 5 | 5 | 5 |
| | | | Content [parts by mass (per 100 parts by mass of particulate polymer (A)] | | 15 | 15 | 15 | 15 |
| | Degassing conditions | | Temperature [° C.] | | 35 | 35 | 35 | — |
| | | | Time [hr] | | 1 | 24 | 48 | — |

TABLE 1-continued

|  | Example 1 | Example 2 | Example 3 | Comparative Example 1 |
|---|---|---|---|---|
| Dissolved carbon dioxide concentration [mg/mL] | 0.08 | 0.02 | 0.01 | 0.10 |
| Coating stability [%] | 100 | 100 | 94 | 80 |

It can be seen from Table 1 that the slurries for a non-aqueous secondary battery of Examples 1 to 3 that were obtained by degassing a mixture to reduce the dissolved carbon dioxide gas concentration of the mixture displayed high coating stability suitable for application onto a battery member surface by an inkjet method. In contrast, it can be seen that the slurry for a non-aqueous secondary battery of Comparative Example 1 that was obtained without performing degassing of a mixture did not have the coating stability necessary for applying the slurry for a non-aqueous secondary battery onto a battery member surface by an inkjet method. Moreover, excessively reducing the dissolved carbon dioxide gas concentration is thought to cause deterioration of coating stability based on Examples 2 and 3.

INDUSTRIAL APPLICABILITY

According to the present disclosure, it is possible to provide a slurry for a non-aqueous secondary battery that can stably be applied onto a battery member surface by an inkjet method and can strongly adhere the battery member to another battery member, and also to provide a method of producing this slurry for a non-aqueous secondary battery.

Moreover, according to the present disclosure, it is possible to provide a battery member for a non-aqueous secondary battery that can strongly adhere to another adjacent battery member, and also to provide a method of producing this battery member for a non-aqueous secondary battery.

Furthermore, according to the present disclosure, it is possible to provide a non-aqueous secondary battery in which battery members are strongly adhered.

The invention claimed is:

1. A slurry for a non-aqueous secondary battery comprising a particulate polymer (A) and water, and having a dissolved carbon dioxide gas concentration of not less than 0.01 mg/mL and not more than 0.08 mg/mL.

2. A battery member for a non-aqueous secondary battery comprising:
   a substrate; and
   an adhesive material formed in plurality in a dotted form on at least one surface of the substrate, wherein
   the substrate is a separator substrate or an electrode substrate, and
   the adhesive material is a dried product of the slurry for a non-aqueous secondary battery according to claim 1.

3. A non-aqueous secondary battery comprising the battery member for a non-aqueous secondary battery according to claim 2.

4. A method of producing a battery member for a non-aqueous secondary battery comprising an application step of applying the slurry for a non-aqueous secondary battery according to claim 1 onto a surface of a substrate by an inkjet method, wherein
   the substrate is a separator substrate or an electrode substrate.

5. The method of producing a battery member for a non-aqueous secondary battery according to claim 4, further comprising a slurry degassing step of reducing the dissolved carbon dioxide gas concentration of the slurry for a non-aqueous secondary battery according to claim 3 before the application step.

6. The method of producing a battery member for a non-aqueous secondary battery according to claim 4, wherein a substrate production apparatus including at least a degassing module that reduces the dissolved carbon dioxide gas concentration of the slurry for a non-aqueous secondary battery, an inkjet head that ejects the slurry for a non-aqueous secondary battery, and a supply tank that supplies the slurry for a non-aqueous secondary battery to the inkjet head is used, and the slurry for a non-aqueous secondary battery is circulated, in order, in the supply tank, the degassing module, and the inkjet head.

7. A method of producing a slurry for a non-aqueous secondary battery according to claim 1, the method comprising a degassing step of reducing dissolved carbon dioxide gas concentration of a mixture containing a particulate polymer (A) and water.

8. The method of producing a slurry for a non-aqueous secondary battery according to claim 7, wherein degassing is performed in the degassing step until the dissolved carbon dioxide gas concentration of the mixture is not less than 0.01 mg/mL and not more than 0.08 mg/mL.

* * * * *